(12) United States Patent
Evans

(10) Patent No.: US 6,616,971 B2
(45) Date of Patent: Sep. 9, 2003

(54) COMPOSITE ARTICLES INCLUDING PREPREGS, PREFORMS, LAMINATES AND SANDWICH MOLDINGS, AND METHODS OF MAKING THE SAME

(75) Inventor: David A. Evans, Lowell, MA (US)

(73) Assignee: Complastik Corporation, Andover, MA (US)

(*) Notice: Subject to any disclaimer, the term of this patent is extended or adjusted under 35 U.S.C. 154(b) by 0 days.

(21) Appl. No.: 09/731,051

(22) Filed: Dec. 6, 2000

(65) Prior Publication Data

US 2003/0054150 A1 Mar. 20, 2003

Related U.S. Application Data

(63) Continuation of application No. PCT/US99/12621, filed on Jun. 8, 1999.
(60) Provisional application No. 60/088,514, filed on Jun. 8, 1998.

(51) Int. Cl.[7] .............................................. C23C 16/26
(52) U.S. Cl. ........................... 427/249.3; 427/255.24; 428/297.4; 428/359; 428/361; 428/365; 428/372; 428/378; 428/385
(58) Field of Search ..................... 428/332, 297.4, 428/314.4, 359, 361, 365, 372, 378, 381, 385; 427/185, 195, 249.3, 255.24

(56) References Cited

U.S. PATENT DOCUMENTS

| 3,632,366 A | 1/1972 | Hiraga et al. |
| 3,713,962 A | 1/1973 | Ackley |
| 3,742,106 A | 6/1973 | Price |
| 3,784,433 A | 1/1974 | Garnish et al. |
| 3,862,287 A | 1/1975 | Davis |
| 3,939,024 A | 2/1976 | Hoggatt |
| 3,993,726 A | 11/1976 | Moyer |
| 3,993,843 A | 11/1976 | Vasta |
| 4,058,581 A | 11/1977 | Park |

(List continued on next page.)

FOREIGN PATENT DOCUMENTS

| DE | 40 32 934 A1 | 4/1992 |
| EP | 0 376 654 A2 | 7/1990 |
| EP | 0 406 067 A1 | 1/1991 |
| GB | 1 544 249 | 4/1979 |
| GB | 1 570 000 | 6/1980 |
| WO | 86/03449 | 6/1986 |
| WO | 92/00182 | 1/1992 |
| WO | 93/02127 | 2/1993 |

OTHER PUBLICATIONS

May, L.C. et al., "Graphite–Reinforced Thermoplastics", 31st Annual Technical Conference, Feb. 3, 1976.
S.G. Hill et al., "Advanced Thermoplastic Composite Development", U.S. Department of Commerce NTIS, May 1979.

Primary Examiner—Merrick Dixon
(74) Attorney, Agent, or Firm—Wolf, Greenfield & Sacks, P.C.

(57) ABSTRACT

The present invention relates to high quality composite materials from fibers such as glass, polyaramid or graphite fibers, where the composite incorporates a polymer matrix embedding individual fibers. The composites are lightweight materials displaying enhanced strength and durability. In one aspect, the polymer matrix is a thermoplastic or other polymer type that cannot easily penetrate gaps between individual fibers by typical methods for thermosets. The invention also relates to methods for forming composite materials, where the fiber is exposed to an emulsion including polymer particles having sufficiently small dimensions to allow impregnation into the fiber gaps. Composite sheets and articles are also described, as well as the formation of new composites for porous articles, e.g., ceramics or wood, where a polymer matrix is embedded within the pores.

36 Claims, 3 Drawing Sheets

U.S. PATENT DOCUMENTS

| | | | |
|---|---|---|---|
| 4,187,142 A | 2/1980 | Pickelman et al. |
| 4,222,918 A | 9/1980 | Zentner et al. |
| 4,474,906 A | 10/1984 | Nakama et al. |
| 4,489,129 A | 12/1984 | Shue et al. |
| 4,549,920 A | 10/1985 | Cogswell et al. |
| 4,559,262 A | 12/1985 | Cogswell et al. |
| 4,588,538 A | 5/1986 | Chung et al. |
| 4,626,306 A | 12/1986 | Chabrier et al. |
| 4,680,224 A | 7/1987 | O'Connor |
| 4,731,276 A | 3/1988 | Manning et al. |
| RE32,772 E | 10/1988 | Hawley |
| 4,792,481 A | 12/1988 | O'Connor et al. |
| 4,838,974 A | 6/1989 | Nied et al. |
| 4,874,563 A | 10/1989 | McMahon et al. |
| 4,883,552 A | 11/1989 | O'Connor et al. |
| 4,894,105 A | 1/1990 | Dyksterhouse et al. |
| 4,900,499 A | 2/1990 | Mills |
| 4,921,558 A | 5/1990 | Johnson et al. |
| 5,017,643 A | 5/1991 | Snelling et al. |
| 5,019,427 A | 5/1991 | Soules |
| 5,024,876 A | 6/1991 | Bobsein et al. |
| 5,055,242 A | 10/1991 | Vane |
| 5,057,338 A | 10/1991 | Baucom et al. |
| 5,076,872 A | 12/1991 | Nakagawa et al. |
| 5,084,222 A | 1/1992 | Glemet et al. |
| 5,091,036 A | 2/1992 | Taylor |
| 5,102,690 A | 4/1992 | Iyer et al. |
| 5,114,516 A | 5/1992 | Pilling et al. |
| 5,124,073 A | 6/1992 | Goffing et al. |
| 5,128,198 A | 7/1992 | Dyksterhouse et al. |
| 5,128,199 A | 7/1992 | Iyer et al. |
| 5,207,850 A | 5/1993 | Parekh |
| 5,210,128 A | 5/1993 | Johnson |
| 5,213,843 A | 5/1993 | Working |
| 5,227,236 A | 7/1993 | Handermann |
| 5,275,883 A | 1/1994 | Leone et al. |
| 5,286,561 A | 2/1994 | Johnson et al. |
| 5,344,687 A | 9/1994 | Grimnes |
| 5,355,567 A | 10/1994 | Holliday |
| 5,464,684 A | 11/1995 | Vogelsang et al. |
| 5,529,652 A | 6/1996 | Asai et al. |
| 5,549,807 A | 8/1996 | Bell et al. |
| 5,549,965 A | 8/1996 | Heinrich et al. |
| 5,569,344 A | 10/1996 | Grimnes |
| 5,593,758 A | 1/1997 | Lopez et al. |
| 5,614,139 A | 3/1997 | Cutolo et al. |
| 5,618,367 A | 4/1997 | Wilkinson et al. |
| 5,624,386 A | 4/1997 | Tailor et al. |
| 5,658,510 A | 8/1997 | Carraro et al. |
| 5,660,923 A | 8/1997 | Bieler et al. |
| 5,725,710 A | 3/1998 | Pfeiffer et al. |
| 5,747,137 A | 5/1998 | Cutolo et al. |
| 5,756,206 A | 5/1998 | Davies et al. |
| 5,817,223 A | 10/1998 | Maloney |
| 5,827,608 A | * 10/1998 | Rinehart et al. ............ 428/332 |
| 5,856,252 A | 1/1999 | Lange et al. |
| 5,980,714 A | 11/1999 | Puyenbroek et al. |
| 6,093,359 A | 7/2000 | Gauchel et al. |

\* cited by examiner

COMPOSITE ARTICLES INCLUDING PREPREGS, PREFORMS, LAMINATES AND SANDWICH MOLDINGS, AND METHODS OF MAKING THE SAME

RELATED APPLICATIONS

This application is a continuation of prior application No. PCT/US99/12621, filed Jun. 8, 1999, which claims the benefit of U.S. provisional application Ser. No. 60/088,514, filed Jun. 8, 1998, entitled "Thermoplastic Composite Prepregs, Preforms and Moldings", by David A. Evans, incorporated herein by reference.

FIELD OF INVENTION

The present invention relates to composite articles such as fiber resin composites having a polymer matrix embedding individual fibers, and composite prepregs having individual fibers with a coating of polymer particles. The invention further relates to methods for making such composite articles, such as the use of an emulsion with polymer particles of sufficiently small size to penetrate gaps between individual fibers. The invention also relates to other composite articles in which a porous material has a polymer matrix embedded within pores of the material.

BACKGROUND OF THE INVENTION

There has been a long-felt need for lightweight fiber-resin composite materials which display greater strength than currently known composites. Fiber resin composites include fibrous articles, sheets and strands (e.g., tow or yarn) which incorporate a polymer matrix embedding fiber bundles or individual fibers of the article, sheet or strand. One major application of these composites are materials for military airplanes.

There are two major types of fibers used in composites—chopped glass fibers and continuous fibers. Chopped glass fibers are used to make composites of relatively lower strength. These composites contain from 20% to 40% of fiber by volume, usually as a mat, as described in U.S. Pat. No. 3,713,962. Stiffer and/or stronger composites use continuous fibers in yarn form and contain more than 50% fiber by volume. Examples of stiffer fibers include graphite, polyaramid or special glass fibers. As the volume of fiber in the composite increases, obtaining a uniform matrix between the fibers tends to be more difficult.

Composites are often prepared via a "prepreg," i.e. a composite precursor, in which the fibrous articles or strands are impregnated with a polymer matrix precursor mixture (e.g. U.S. Pat. No. 3,784,433). Prepregs are typically placed in a mold with the fibers positioned in a desired sequence and orientation and subsequently heated under pressure to fuse or polymerize the precursor components to form the polymer matrix of the final composite. The prepreg allows control of the resin content and fiber orientation. Prepregs can be provided as collimated tapes or fabrics.

One type of polymer matrix comprises thermoset plastics or resins. Thermoset resins typically are prepared from precursor mixtures comprising an oligomer and a crosslinking reagent. When heat or energy is applied, the precursor mixture reacts to form a hard, three-dimensional, cross-linked polymer matrix. Incorporating thermoset resins in composites is a relatively facile process because the starting components of thermosets are either liquid resins or solutions of the precursors. These are low viscosity liquids from 100 to 5,000 centipoise (0.1 to 5 Pa•s), which can rapidly wet the fibers. Yarns of glass, graphite or polyaramid are easily penetrated by the low viscosity resin to the core of the yarn, thus providing each fiber with a complete coating of polymer.

Thermoset composites suffer from several disadvantages. Low molding pressures are used to prepare these composites to avoid damage to the fibers. These low pressures, however, make it difficult to suppress the formation of bubbles within the composite which can result in voids or defects in the matrix coating. Thus, most processing problems with thermoset composites are concerned with removing entrained air or volatiles so that a void-free matrix is produced. Thermoset composites made by the prepreg method require lengthy cure times with alternating pressures to control the flow of the resin as it thickens to prevent bubbles in the matrix. Some high volume processes, such as resin infusion avoid the prepreg step but still require special equipment and materials along with constant monitoring of the process (e.g. U.S. Pat. Nos. 4,132,755, and 5,721,034). Thermoset polymers are not easy to process, regardless of whether the resin is applied to the yarns before molding or is infused into a preform of fibers. Although thermoset polymers have enjoyed success as in lower performance composites, the difficulties in processing these resins has restricted their application.

To overcome some of the disadvantages of thermosets, the use of thermoplastic resins as a polymer matrix in composites has been attempted. Thermoplastic resins are long chain polymers of high molecular weight. These polymers are highly viscous when melted and are often non-Newtonian in their flow behavior. Thus, whereas thermosets have viscosities in the range of 100 to 5,000 centipoise (0.1 to 5 Pa•s), thermoplastics have melt viscosities ranging from 5,000 to 20,000,000 centipoise (5 to 20,000 Pa•s), and more typically from 20,000 to 100,000 centipoise (20 to 100 Pa•s). Despite a viscosity difference of three orders of magnitude between thermosets and thermoplastics, some processes have been applied to both types of matrices for laminating fibrous materials.

The combination of high viscosity (thermoplastics) and low pressure (processes to avoid fiber breakage or distortion) is a major source of the molding problems with thermoplastic composites. Due to the high viscosity of thermoplastics, most of the processes to form thermoplastic prepregs involve coating the outside of the fiber bundles with a thermoplastic polymer powder rather than coating individual fibers. The polymer powder is then melted to force the polymer around, into and onto the individual fibers. A few processes apply melt directly to the fibers. A tape can be made by coating a dry tape of collimated fibers with the polymer and applying a heated process that forces the polymer into and around the fibers (e.g., see U.S. Pat. Nos. 4,549,920 and 4,559,262). These processes involve a polymer of an exceptionally low melt viscosity, such as polyetherketone (PEEK), as described in U.S. Pat. Nos. 4,883,552 and 4,792,481.

Other processes for incorporating thermoplastics in composites involve preparing a thermoplastic slurry and melting and forcing the slurry onto the yarn (U.S. Pat. No. 5,019,427). A few thermoplastics can be dissolved and introduced into the fiber bundle as a solution. Removal of solvent presents extra processing problems, however. Alternatively, U.S. Pat. No. 5,725,710 describes pretreating the fibers with a dilute dispersion to ease the passage of the melt polymer in a subsequent pultrusion step to make a tape prepreg. Another process involves commingling, in which structural fibers such as graphite or glass are mixed with a thermoplastic fiber and the subsequent hybrid yarn is woven into a fabric to be molded later (e.g., see U.S. Pat. Nos. 5,355,567, 5,227,236 and 5,464,684). Separate yarns of thermoplastic and reinforcement containing many thousands of filaments, however, cannot be mixed mechanically in a one-by-one arrangement of each fiber. The fibers, at best, are dispersed as smaller bundles. The laminates produced by this process typically contain areas that are resin rich and other areas that are mainly fiber and hence void-containing. Commingled thermoplastics are also restricted to only those polymers which form fibers.

In general thermoplastic composites have had limited success to date, due to a variety of factors including high temperatures, high pressures, and prolonged molding times needed to produce good quality laminates. Most of the efforts have been focused on combining high performance polymers to structural fibers which has only exacerbated the process problems.

SUMMARY OF THE INVENTION

One aspect of the present invention is to provide an article, the article comprising a strand of a plurality of fibers and wherein substantially each fiber of the strand is coated by particles of a polymer.

Another aspect of the present invention provides an article comprising a strand of a plurality of fibers, where substantially each fiber of the strand is embedded in a matrix derived from fused polymer particles.

Another aspect of the present invention is a method for forming a composite. The method comprises providing a strand comprising a plurality of fibers and exposing the strand to an emulsion including polymer particles. The method also comprises allowing the particles to form a coating around substantially each individual fiber.

Another aspect of the present invention is to provide a fibrous sheet article comprising a plurality of strands, each strand comprising a plurality of fibers, where substantially each fiber is embedded in a matrix derived from fused polymer particles.

Another aspect of the present invention provides a method for forming a composite fabric. The method comprises providing a fabric comprising a plurality of strands where each strand is a plurality of fibers. Substantially each of the individual fibers of the strands are coated with polymer particles. The method also comprises fusing the polymer particles to form a polymer matrix embedding substantially each fiber.

Another aspect of the present invention provides an apparatus for forming a composite fabric. The apparatus comprises a first roll for supplying a continuous first layer of strands, where each strand of the first layer is aligned along a first direction. The apparatus also comprises at least a second roll for supplying a continuous second layer of strands positioned adjacent the first layer thereby forming a fabric. Each strand of the second layer is aligned along a second direction, where the second direction is different from that of the first direction. The apparatus further comprises a reservoir containing an emulsion including polymer particles where the particles are capable of coating substantially each individual fiber of the strands of the fabric. A conveyor may also be provided to carry the fabric to and from the emulsion reservoir.

Another aspect of the present invention provides a method for forming a composite. The method involves providing an article having pores and exposing the article to a polymer emulsion. The particles of the polymer are allowed to impregnate the pores of the article.

Another aspect of the present invention provides a composite comprising a porous article having polymer particles impregnating the pores of the article.

Another aspect of the present invention provides a composite comprising a porous article having a polymer matrix embedded within the pores of the article.

Other advantages and features of the invention will be apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

The present invention relates to fiber composites having a high-quality polymer matrix, where the matrix is prepared by introducing polymer as particles small enough to penetrate an area between individual fibers. Subsequent fusion of the polymer particles results in a matrix embedding individual fibers, where the matrix is substantially free of voids and defects. The present invention also relates to fabrics having individual fibers coated with a polymer matrix, and to other porous materials such as ceramics and wood that are capable of being impregnated by polymer particles which can be fused to form a matrix.

Figure 1:
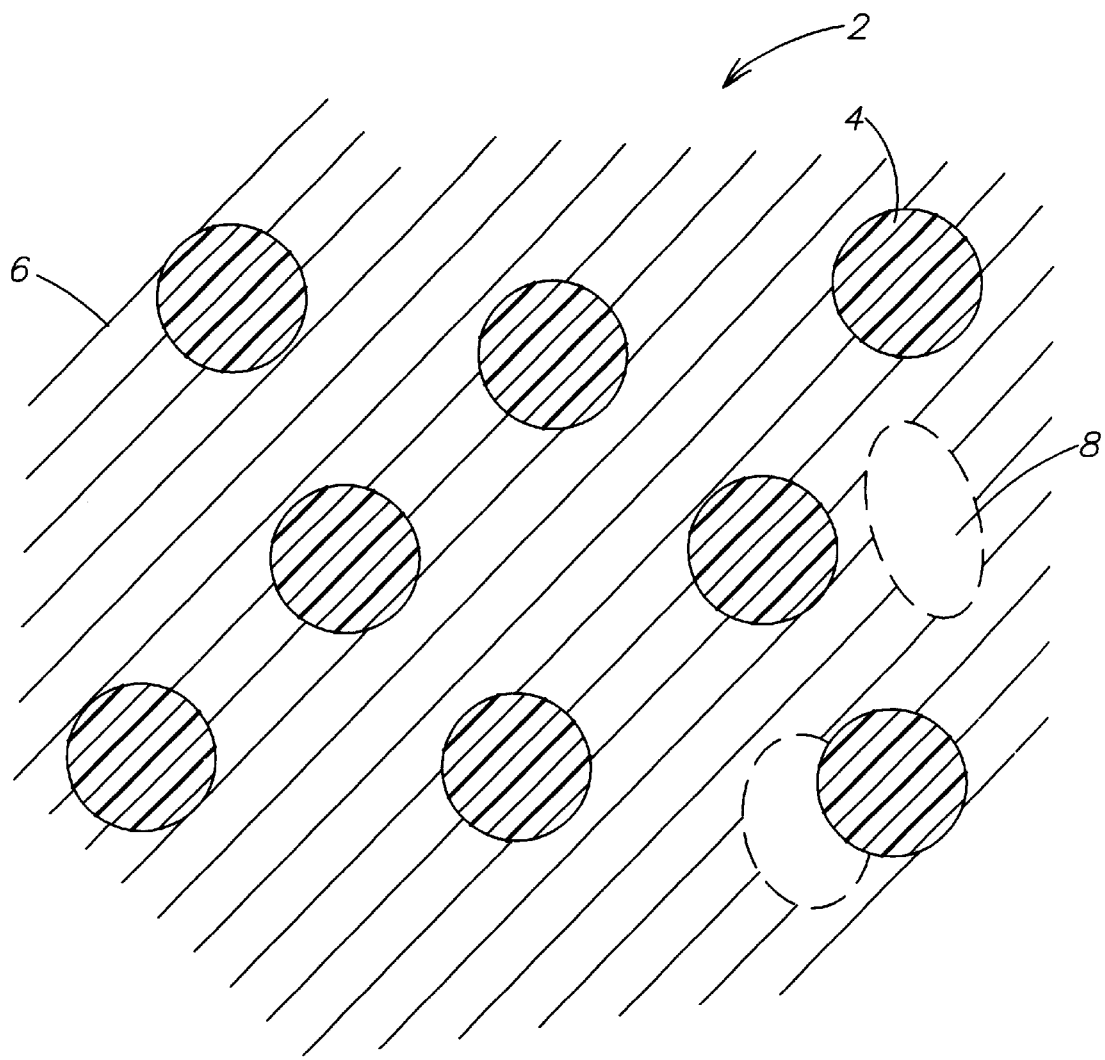
FIG. 1 is a schematic cross-section of a composite article.

FIG. 1 shows a schematic cross section of a fiber composite 2. Composite 2 comprises individual fibers 4 embedded within polymer matrix 6. To enhance composite strength, matrix 6 embeds individual fibers 4. Composite strength is generally dependent on the ability of the matrix 6 to absorb much of the load that may be placed on articles comprising these fibers. Should matrix 6 include voids or other defects, schematically shown in FIG. 1 as matrix holes 8, such defects can lead to degradation of the structural integrity of the matrix 6, and ultimately, loss of strength of composite 2.

An advantageous feature of the present invention involves the ability to impregnate gaps between individual fibers of a fibrous article or strand with a polymer resin. Previous, strategies to impregnate fibers with polymer resins, such as thermoplastics, involved forming a melt and applying high pressure to force the polymer into the fiber cavities. High pressures are necessary, as polymer melts are typically highly viscous fluids. Once the melt has impregnated the cavities, however, the melt can continue to flow, resulting in creation of unwanted voids or spaces in the resulting matrix. In certain cases polymers capable of dissolution in organic solvents can be introduced into the fibers as a solution. However, subsequent removal of the solvent can also lead to the formation of unwanted voids and defects.

As an alternative to forcing polymer melts through fibrous articles, prepregs can incorporate polymer particles. But for many polymers, particles obtained by common grinding methods do not have a sufficiently small size to impregnate the gaps between individual fibers. Thus, these prepregs have a coating of particles outside fiber bundles, as opposed to impregnating individual fibers.

Figure 2:
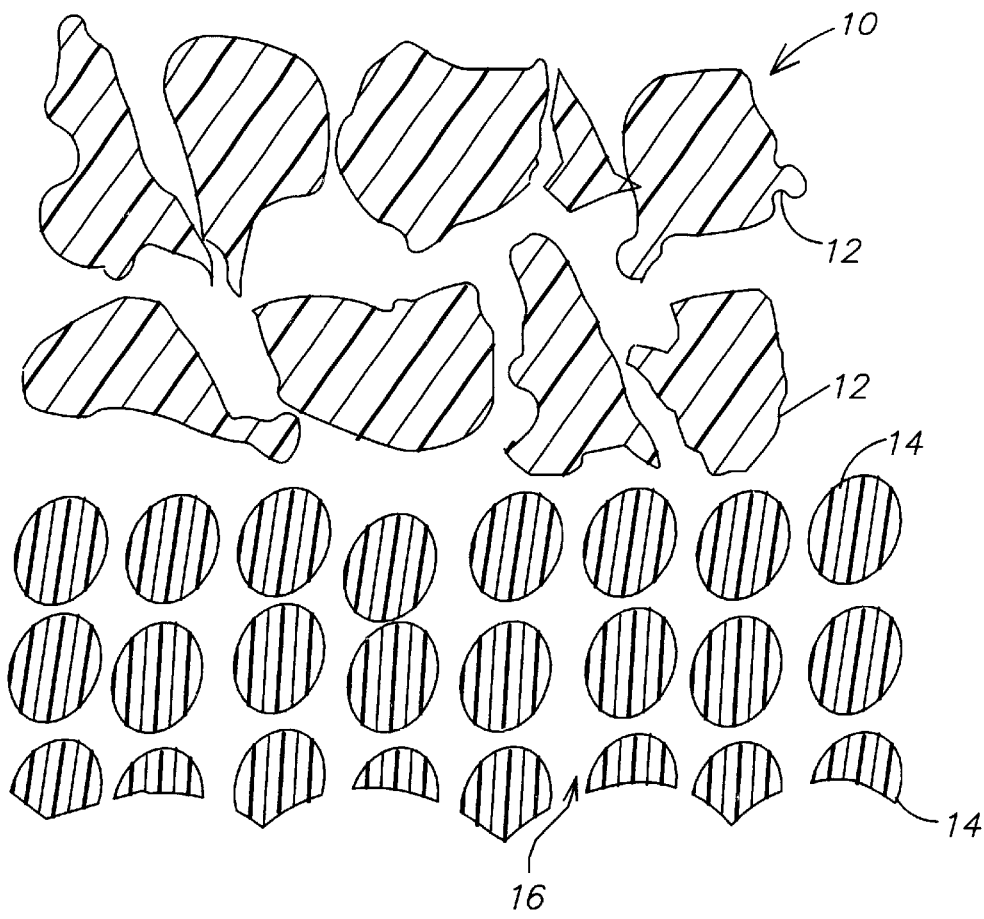
FIG. 2 is a schematic cross-section of a prior art prepreg.

FIG. 2 shows a schematic cross section of a prior art thermoplastic prepreg 10 comprising thermoplastic particles 12, fibers 14, and gaps 16 which exist between the fibers 14. Fibers such as graphite, glass and ordered polymer fibers generally have an average diameter ranging from 7 $\mu$m to 20 $\mu$m in diameter. Thermoplastic particles 12 are usually prepared by dry grinding methods which lead to average particle sizes of 10 $\mu$m to 50 $\mu$m in diameter. Thus, the size of gap 16 is typically smaller than the diameter of particles 12 in prior art thermoplastic prepregs. Due to these large particle sizes, thermoplastic particles 12 are incapable of impregnating into gaps 16 between fibers 14 in a facile manner.

FIG. 2 highlights the small gap sizes and difficulty in impregnating these gaps with polymer melts. High pressures are needed to achieve such impregnation, as discussed previously. Such pressures can add to already existing prepreg and composite processing problems. In addition, even if impregnation between individual fibers has been successfully achieved with polymer melts, subsequent polymer flow can create detrimental voids.

Thus, one aspect of the present invention provides an article comprising a strand having a plurality of fibers, where substantially each fiber in the strand is coated by particles of a polymer. Examples of fibers include glass, graphite and ordered polymer fibers. In reality, each and every fiber in the strand may not be coated by particles of a polymer and thus "substantially each fiber in the strand" refers to coating at least 50% of the fibers, preferably at least 80% of the fibers are individually coated by particles, more preferably at least 90% of the fibers are individually coated by particles, still more preferably at least 95% of the fibers are individually coated by particles, and even more preferably still at least about 99% of the fibers are individually coated by particles. The strand can be provided as a tow or as a yarn. Examples of ordered polymer fibers include Kevlar® and Twaron® polyaramide, polybenzimidazole, polybenzoxazole or polybenzbisthiazole fibers. This aspect involves the formation of a "prepreg," which refers to a precursor of a composite having a polymer resin precursor impregnated into the fibrous material. The resin precursor can be a high molecular weight polymer and/or can include a monomer or oligomer. Subsequent treatment of the prepreg results in formation of the matrix. In one embodiment, the polymer is a solid polymer.

In one embodiment, the polymer can exist as a high viscosity polymer having a viscosity of at least 5,000 centipoise (5 Pa•s), preferably at least 10,000 centipoise (10 Pa•s), more preferably at least 50,000 centipoise (50 Pa•s), still more preferably at least 100,000 centipoise (100 Pa•s) and even more preferably from 100,000 to 20,000,000 centipoise (100 to 20,000 Pa•s). At these viscosity levels, the polymer is incapable of significant flow when incorporated as a matrix in the composite, i.e. the polymer is a non-flowing polymer. The polymer can be a homopolymer or a copolymer, such as a random copolymer or a block copolymer, and can exist as a syndiotactic or stereotactic form of these polymers as well as blends or alloys of any of these polymers.

In one embodiment, the polymer is a thermoplastic. Examples of thermoplastics include polyolefins, polystyrene, polyamides (e.g., nylons), polyketones, polyimides, polypropylene oxide, acrylonitrile-butadiene-styrene (ABS), polyacetals, polyesters, polyphenoxies, polyacrylic esters, polyvinyl esters, polyvinyl halides, polysiloxanes, polyurethanes, polyethers, polysulfides, polycarbonates, polybutylenes and polyarylates.

In one embodiment, the polymer is not a true thermoplastic, i.e., further chemical reactions are required to form the final polymer. The thermoplastic may contain a crosslinking agent in the polymer chain such as a carboxyl group in an acrylic copolymer or it may be formulated with an external crosslinker such as a phenoxy with a multivalent amine. Whenever and however the polymer is crosslinked, the invention can still be applied to penetrate the strand with the corresponding polymer particles and to subsequently fuse these particles into a matrix. If the polymer is crosslinked, preferably the polymer is incapable of flow (i.e., non-flowing) when incorporated as a matrix in the composite.

Figure 3:
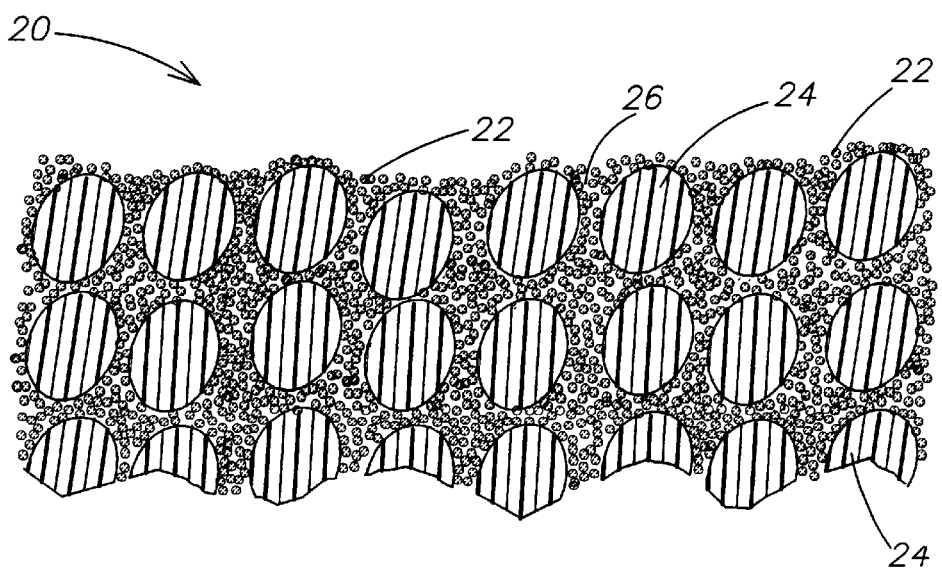
FIG. 3 is a schematic cross-section of a prepreg having particles of a sufficiently small size to impregnate gaps between individual fibers.

FIG. 3 shows, as an embodiment of the present invention, a schematic cross-section of prepreg 20. Prepreg 20 comprises fibers 24 and polymer particles 22, where polymer particles 22 have a sufficiently small diameter that allows particles 22 to impregnate the gaps 26 between individual fibers 24.

Figure 4:
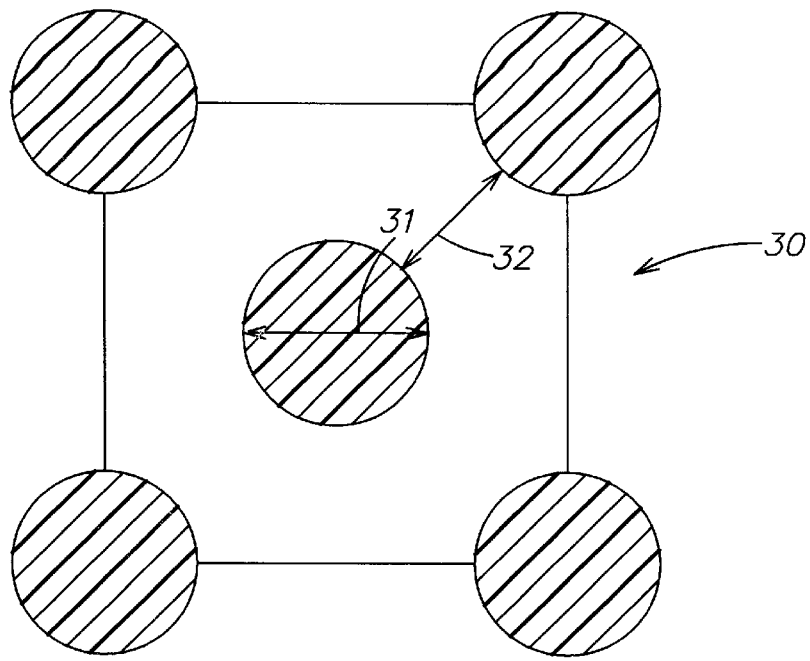
FIG. 4 is a theoretical, schematic fiber bundle in a cubic close-packed arrangement, enabling a calculation of gap sizes.

FIG. 4 shows, as an embodiment of the invention, a schematic expanded cross-sectional area of a fiber bundle. By assuming a theoretical cubic packing arrangement 30 of fibers in the bundle and knowing the average fiber diameter 31, a theoretical gap dimension 32 can be calculated. In reality, the gap dimensions are variable, with some dimensions being greater or smaller than the theoretical size.

Figure 5:
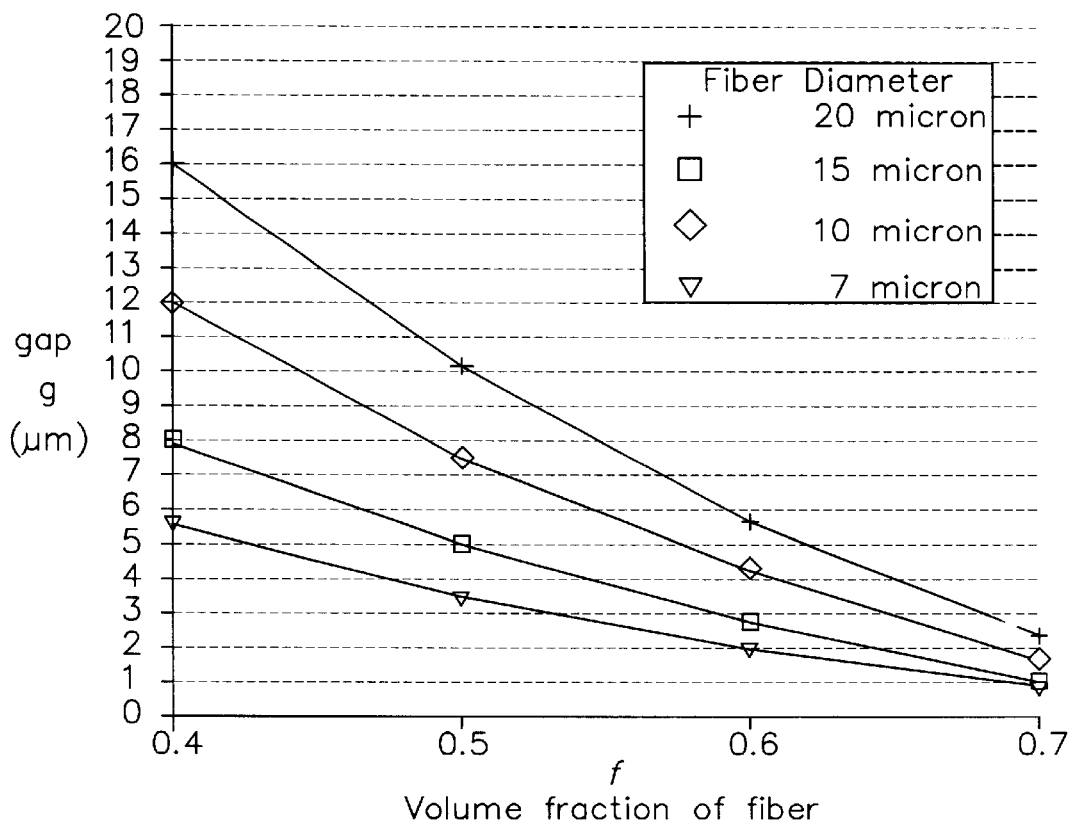
FIG. 5 is a plot of volume fraction of fibers having a cubic close-packed arrangement (abscissa) versus gap size (ordinate).

FIG. 5 is a graphical representation of the gap between the fibers in a composite. In FIG. 5, the abscissa represents the volume fraction if occupied by fiber in the bundle having a cubic close-packed arrangement as in FIG. 4 and the ordinate represents the gap size in micrometers ($\mu$m). In one embodiment, the bundle has a fiber volume of 40 to 70% in the final composite. The theoretical minimum gap, g, between fibers is plotted in FIG. 5 for typical fiber sizes in a composite (see gap dimension 32 of FIG. 4). For example, for a fiber diameter of 20 $\mu$m and a volume fraction of 0.5, the theoretical gap would be approximately 11 $\mu$m. Even for a volume fraction of as low as 0.4, a fiber having a diameter of 20 $\mu$m will have a theoretical gap of only 17 $\mu$m, less than the typical prior art particle dimensions of 20 to 50 $\mu$m and thus preventing penetration of particles through these gaps.

The success of resin transfer molding and resin infusion processes for thermosets indicates that the flow of these low viscosity resins are helped by surface tension or "capillary" forces. When a low viscosity resin is injected into a tightly packed preform of yarns, there is no pressure at the front of the resin as it advances through the preform. Preforms are completely infused by these thermosets despite the lack of pressure. At the size of gap indicated in FIG. 5, capillary forces would be significant to help introduce a liquid epoxy thermoset into the gap. In fact, the smaller the gap, the higher the capillary force, and these capillary forces may be helping the impregnation of thermosets into prepregs.

Because the viscosity of a melted thermoplastic is three orders of magnitude higher and the surface tension of the melt will be very low because of the high molecular weight, capillary forces are most likely insignificant for thermoplastics. Thus thermoplastic composite fabricators (of the prior art) have previously relied on external pressure to force the resin into the fiber gaps. The gap between fibers is typically very small and would require high pressures to obtain significant flow of the polymer melt through the gaps. These high pressures could in fact force the fibers to close up on each other and further limit the penetration of the yarns by the resin. External pressures are typically higher for prior art thermoplastics—up to 500 psi (3450 kPa) for molding. Only thermoplastics with lower viscosity melts (polypropylene, polyamides, polyesters and special grades of polyether ketone as in U.S. Pat. No. 4,549,920) have had limited success in composites.

Thus, in one embodiment the polymer particles used in the present invention have an average diameter of less than 0.25 times the fiber diameter to allow facile impregnation of particles through the gaps. In another embodiment, the particles have an average diameter of less than 5 $\mu$m, preferably less than about 1 $\mu$m, more preferably less than about 0.5 $\mu$m, and more preferably still, less than about 0.25 $\mu$m.

Another aspect of the present invention provides an article comprising a strand comprising a plurality of fibers where substantially each fiber is embedded in a matrix derived from fused polymer particles. Referring back to FIG. 3, prepreg 20 can be subjected to conditions of heat and/or pressure that allow the particles 22 to be fused together to form a continuous polymer matrix to embed the individual fibers 24. By the use of prepreg 20 comprising individual fibers 24 coated with polymer particles 22, a matrix can be achieved that is substantially free of voids and/or other defects. A defect-free matrix cannot be accomplished when a polymer melt is forced at high pressure in the gaps between the individual fibers due to continuing flow of the matrix once the melt has impregnated the fibers.

Another aspect of the present invention is a method for forming a composite. The method involves providing a strand which comprises a plurality of fibers. The strand is then exposed to an emulsion including polymer particles. In this aspect, the emulsion includes polymer particles of a size small enough to allow the particles to form a coating around substantially each individual fiber.

In one embodiment, the emulsion including polymer particles is provided through emulsion polymerization. Emulsion polymerization is effected when a water-insoluble monomer is placed in an aqueous solution and allowed to polymerize, where polymerization is initiated by the production of free radicals in the water phase. Thus, the polymer can be any polymer capable of being formed by addition polymerization. In one embodiment, the monomer is a liquid. In another embodiment, the monomer includes a vinyl group. An example of such monomers include acrylic acid and esters, methacrylic acid and esters, styrene, acrylonitrile, vinyl chloride, vinylidene, butadiene and others. Examples of polymers made by emulsion polymerization include polystyrene and acrylonitrile-butadiene-styrene (ABS) copolymers. Emulsion polymerization results in polymer particles of small sizes, typically between 0.1 $\mu$m to 0.25 $\mu$m, and these polymers have high molecular weights of at least 10,000 g/mol.

In another embodiment, the emulsion including polymer particles is produced by a method of grinding polymer solids to a predetermined particle size, preferably by a wet grinding method. Preferably, the predetermined particle size has dimensions described previously and is dictated by the fiber diameters. Polymers such as polyketones, polyesters, polyamides, polysulfones, polysulfides and others can be ball mill ground to a stable emulsion by various methods known in the art.

Wet grinding methods such as ball-milling gives the opportunity for introducing mineral or metallic materials for the modification of the properties of the final composite material. In one embodiment, the polymer particles include an additive. Additives can be pigments for coloring, flame retardants, inert fillers for cost reduction such as bentonite, metallic fillers such as silver for the control of conductivity or fillers such as aluminum or silica powder for the control of thermal expansion. Preferably the particles are as small as the polymer particles. Providing the additives do not destabilize the emulsion, the composite can be varied by numerous parameters.

In one embodiment, an additive comprises a particle selected from the group consisting of ceramic and metallic particles. A small amount of polymer may carry a significant amount of ceramic or metallic particles and carry those same particles into bundles of suitable fibers. An intermediate stage, containing the metallic or ceramic matrix pressed together with the polymer, gives a nearly net sized preform for the final stage where the polymer is removed by burning off the polymer and the matrix is fused together. By this embodiment, it is possible to prepare ceramic or metallic composites. This embodiment overcomes many of the problems of oxidation and contamination in handling very fine powders of ceramics or metals.

In another embodiment, the emulsion including polymer particles can be prepared by precipitation from solution. The method of making these polymers is described in U.S. Pat. Nos. 3,993,843 and 4,222,918, both patents being hereby incorporated by reference in their entirety.

An advantageous feature of the present invention allows the individual fibers to be coated with the polymer particles in the absence of high pressures, thus avoiding certain prior art methods of forcing polymer melts under pressure into the gaps between the fibers. In one embodiment, each individual fiber is coated with particles by exposing the strand to the emulsion in a manner that "wets" the strand with a sufficient amount of the emulsion. The exposing can occur by immersing or dipping the strand in the emulsion, spraying the strand with the emulsion, painting the strand, or any other wetting means. Because the particles in the emulsion have sufficiently small dimensions, simply exposing the strand to the emulsion allows particles to impregnate the gaps between individual fibers.

In one embodiment, the method comprises fusing the particles in the coating to form a polymer matrix around substantially each individual fiber. In one embodiment, the particles are fused by applying an elevated temperature to the particles. The temperature is typically at least 125° C. In another embodiment, the particles are fused by applying a pressure to the particles, typically pressures of at least 50 psi (345 kPa). In one embodiment, both elevated temperatures and high pressures can be applied to fuse the particles.

Many polymers fuse as a continuous film if cured above a temperature known as the minimum film-forming temperature (MFT). The MFT is related to the glass transition temperature ($T_g$) of the polymer. Typically, MFT is less than the $T_g$ and more preferably between 10° C. to 20° C. less than the $T_g$. For example, a polymer has a $T_g$ of at least 80° C. and hence a high MFT of at least 60° C. Curing below the MFT results in a powder which can be easily lost from the prepreg. In one embodiment, the polymer has a $T_g$ of at least 50° C. and more preferably at least 80° C.

The fusing step can be preceded by a drying step. Typically, drying is accomplished by air drying or by other methods known in the art. In another embodiment, the drying allows the polymer to fuse, e.g., if the temperature of the latex is above the minimum MFT, the thermoplastic particles will fuse during the final stages of drying.

Fusing at lower temperatures may also be induced by adding small amounts of a low $T_g$ polymer by any method known in the art. In one embodiment, the MFT can be lowered by using a coalescent or adding a second polymer with a low MFT. Coalescents are a well-known art in latex coating. A small amount of solvent is emulsified and added to the latex and has the effect of lowering the MFT during the critical film-forming stages. Examples of solvents suitable for styrenics and acrylics are 1-phenoxy-2-propanol (Dowanol DPH) and Di-propylene butylene glycol (Dowanol DPNB). These are blended with water and 1% Aerosol OT at 50% until emulsified. Sufficient emulsion can be added to make the solvent content between 1 and 3% in the latex.

By careful process control, the outside of a tape or fabric prepreg can be brought above the MFT while the core of the prepreg stays below MFT. The prepreg thus formed has a powder inside the yarns and a fused layer on the outside of the yarn. This prepreg has flexibility and formability but does not lose resin during handling. Thus, in one embodiment, an outer layer of the prepreg is fused where the fused outer layer contains an inner core of unfused polymer particles This embodiment provides better fusing properties, for example when making a thick heavy preform.

In one aspect the present invention affects how the final molding is produced. The particles of polymer that are infused into the strand can be simply fused together. There is no actual flow needed to make a composite, as was necessary in the prior art. Thus it is possible that a very high molecular weight polymer can be used to make a composite where the polymer is substantially non-flowing, such as polymers having molecular weights of at least 5,000 g/mol and preferably at least 10,000 g/mol. Such a situation exists with polytetrafluoroethylene where a solid polymer is made by sintering powder together at high temperatures.

Some emulsion polymers can incorporate cross-linking comonomers to improve the final polymer properties. Such copolymers can be used to make composites by the invention even though the crosslinker may have reacted before the temperature is high enough for pressing.

Even linear thermoplastics can have high melt viscosities such that flow or spreading of the composite becomes difficult. Low viscosity thermosets allow the yarn bundles to flatten during pressing when those yarn bundles are large—as in heavy weight fabrics. With prepregs of the invention, the yarns will not flatten when pressed between parallel sheets. A pressure distributing medium is required to ensure that pressure is maintained on all parts of the laminate. This distributing medium can be a layer of rubber. A thickness of 0.75 to 1.5 mm of silicone rubber can be used for glass impregnates with weights up to 34 oz/yd$^2$ (1.15 kg/m$^2$). A layer of unreinforced polymer can also be used and would have the added advantage of providing a finished side to the laminate.

Another aspect of the present invention provides a fibrous sheet article. The article comprises a plurality of strands, each strand comprising a plurality of fibers. Substantially each fiber is embedded in a matrix derived from fused polymer particles, as described previously.

In one embodiment, the prepreg is provided as a fabric, such as a tape. In the prior art, because large particles were only attached to the surface of the fiber bundles, the thickness of prepregs was restricted to what could be filled by the outside layer of resin. An advantageous feature of the method of the present invention is that the particles can penetrate very thick layers of fabrics (e.g., up to 50 oz/sq. yd (7 kg/m$^2$) in weight) because of the capability of the polymer particles to impregnate between individual fibers. For heavy fabrics, a single ply of fabric can be formed, impregnated and molded to make useful moldings. Stitch-locked glass fabrics are in common use in the boating industry and these are economical. Glass fabrics with low-cost lattices can provide moldings that compete in price with many other materials.

Heavy fabrics can also be impregnated on a continuous basis and formed into sheets. If the process is modified with a hot nip roll before the cold nip roll, the process can produce continuous sheet materials from heavy glass fabrics or other fiber forms. Rather than rolling up the sheet, it can be cut to length with a flying saw. The sheet material is useful as flat sheet stock. Because of the thermoplastic matrix, however, it can be reformed with heat into many more useful products.

Another aspect of the present invention provides a method for forming a composite fabric. The method involves providing a fabric comprising a plurality of strands, each strand comprising a plurality of fibers. The strands are then positioned in a predetermined orientation by methods known in the art. Substantially each individual fiber of the strands can be coated with polymer particles, preferably by exposing the article to an emulsion including polymer particles of sufficiently small size to penetrate gaps between individual fibers, as described previously. The polymer particles can then be fused to form a polymer matrix around each fiber. The fusing may be accomplished under elevated temperatures and/or pressures. The fabric may be coated with an additional layer, such as a nylon layer, to protect the fabric during the fusing step, if accomplished with an iron, and to prevent the fabric from sticking to the iron.

In one embodiment, prior to coating, the plurality of strands can be formed into a fabric by a process selected from the group consisting of weaving, braiding, needle-punching, knitting and stitching. In another embodiment, these processes can be omitted as the final composite has sufficient structural integrity without the extra processing steps.

In one embodiment, the fabric is provided in a continuous fashion. This providing step can comprise providing a first roll for supplying a continuous first layer of strand. Typically, this layer comprises strands positioned side-by-side where each strand in the layer is aligned along the same direction. At least a second roll of strand can be positioned adjacent the first layer of strands (e.g. on top of the first layer) where the second layer has strands positioned side-by-side in a different direction from that of the first layer of strands. An example of providing the fabric continuously via a plurality of rolls is described in U.S. Pat. No. 5,055,242, hereby incorporated by reference in its entirety, where up to six rolls of different strand layers can be provided to form the fabric. Each subsequent layer provides strands aligned along different directions. For example, if a first strand is provided in a direction of 0°, the next strand can be provided in a direction anywhere between +45° and −45°. One of ordinary skill in the art can select the desired direction of strands for each layer, depending on the particular application of the fabric. Upon formation of the fabric in a continuous fashion, the fabric can be exposed to the emulsion, the polymer particles can be fused to form a matrix and the fabric can be shaped by pressing the composite fabric into a desired geometry.

Another aspect of the present invention provides an apparatus for forming a composite fabric. The apparatus comprises a first roll for supplying a continuous first layer of strands and at least a second roll for supplying a continuous second layer of strands positioned adjacent the first layer (e.g. on top of the first layer) to form the fabric. Of course more than two rolls can be used, the number of rolls being dictated by the particular application of the fabric. As described previously, each layer will have a different direction of strands from an adjacent layer. The apparatus can further comprise a reservoir containing an emulsion including polymer particles, where the particles are capable of coating substantially each individual fiber of the strands of the fabric.

One advantageous embodiment of the apparatus provides a conveyor to carry the fabric to and from the emulsion reservoir. The conveyor can be a conveyor belt or a series of pulley-like mechanisms or rollers that allow a continuous sheet, arising from a roll, to be carried into the emulsion and out of the emulsion to be further processed. After the emulsion reservoir, the apparatus can include a press to shape the fabric. The apparatus preferably includes a heat source to fuse the particles coating the substantially each individual fiber to form a polymer matrix embedding the individual fibers.

Another aspect of the present invention provides a method for forming a composite, starting with an article having pores. Various porous articles can achieve increased structural properties by the addition of a polymer matrix. The porous article can be a ceramic, wood or a foam. The article can be exposed to an emulsion including polymer particles, such that the particles impregnate the pores of the article. Fusing the particles can result in a polymer matrix embedded within pores of an article.

In one embodiment, two layers of the prepreg of the invention are consolidated in a press and then arranged on each side of the porous article. If the porous article is treated with latex emulsion, the thermoplastic composite sheets can be bonded to it with heat and a low pressure. The sandwich structure thus formed has many useful properties.

If the porous article is wood, composites of wood display better stiffness and strength than the original wood. Foams can be treated with latex to make lightweight sandwich structures. Foams and balsa wood are useful cores for sporting goods, such as skis and snowboards, having thermoplastic composite skins bonded to the core.

These and other embodiments of the present invention will be more fully understood from the examples below. The following examples are intended to illustrate the benefits of the present invention, but do not exemplify the full scope of the invention.

EXAMPLE 1

A styrene/acrylic copolymer emulsion (SA 204 from Para-Chem Inc.) was selected because of its properties. The polymer has a $T_g$ (glass transition temperature) of around 200° F. if prepared by non-emulsion methods. If prepared by emulsion polymerization, SA204 has a $T_g$ of 50° F. The latex has particles around 200 nanometers in size.

Glass fabrics are coated generously by immersing the fabrics in the emulsion and allowed to air dry for 16 hours. Once they are essentially dry, the sheets of prepreg are covered each side with a nylon film. The film coated prepreg is then pressed with a smoothing iron set at 200° F. (93° C.) resulting in a fusing of the particles. (Small latex particles will fuse when taken above their glass transition temperature without melting).

Subsequently, the prepreg sheets are press molded into high quality laminates. Prepreg layers are stacked in the desired orientation and heat tacked together to maintain that orientation. The stack is then loaded into a preheated press at 340–360 ° F. (171–182° C.). A pressure of 30 to 40 psi (207 to 276 kPa) is applied to the stack for 2 minutes and the press is then opened for 1 minute to allow any water (steam) to escape. Pressure is reapplied at 100 psi (689 kPa) on the stack for 2 minutes. The press is then cooled as rapidly as possible to below 200° F. (93° C.) while maintaining pressure. Once the laminate is cooled; the pressure is relieved.

This process produces stiff, strong laminates with high fiber content. The laminates can subsequently be reshaped by heating to 250° F. (121° C.) and forming to the desired shape. Providing 270° F. (132° C.) is not exceeded and the laminate is not bent too far, the integrity of the laminate is maintained during re-forming. Laminate properties are sufficient for many everyday applications. Woven and stitch-locked fabrics of many styles have been successfully converted into laminates by this technique. SA 204 prepregs are molded at temperatures and pressures which most composite molders can achieve.

The technique described above is a laboratory technique that can be scaled up and automated. The process can be transferred to a textile treater, preferably with a clip type tenter frame. The drying and fusing stages described above can be completed in one operation by passing through a drying oven at 200–300° F. (93–149° C.). Passing the fused prepreg through a hot nip ensures that air is excluded and the fibers are pushed together. Thin fabrics will make prepregs that can be wound as rolls but heavy fabrics can be sheeted at the end of the treater.

EXAMPLE 2

Table 1 shows the strength properties of example fibrous articles of the present invention. All properties are normalized to 60% fiber by volume. The fabrics in Table 1 are all 18 oz (0.61 kg/m$^2$) non-woven, stitched glass fabric with equal 0° and 90° fibers (BTI's 1800 style). The fabrics were coated with a thermoplastic latex as described in Example 1. The coating was dried at 250° F. (121° C.) for 30 minutes. Eight plies of the prepreg were then pressed together with each layer laid up in the same direction. The plies were pressed together under 100 psi (689 kPa) pressure at 360° F. (182° C.).

TABLE 1

Fiber composite properties

| Thermoplastic type | Manufacturer (Thermoplastic number) | Apparent Flexural Strength (ksi) (MPa) | Apparent Flexural Modulus (msi) (GPa) |
|---|---|---|---|
| Vinyl acetate/ Acrylic | Air Products, Inc. (Vancryl 989) | 68.8 (474) | 2.66 (18.3) |
| Acrylic | Parachem (Paracryl 8444) | 71.2 (491) | 3.60 (24.8) |
| Styrene/Acrylic | Parachem (SA-204) | 77.4 (533) | 2.93 (20.2) |
| Acrylic | Polymer Latex Corp. (Rohamere 4010D) | 54.6 (376) | 2.70 (18.6) |

EXAMPLE 3

Continuous graphite fiber tows (strands) are dipped into a bath of SA 204 latex while being spread over a plexiglass bar. The tows are then passed through a tube oven with a wall temperature of 550–650° F. (288–343° C.). The tow spends about 30 seconds in the oven while the water is flashed off and the latex particles are fused. As it exits the oven, the tow is passed through rollers to flatten it to a uniform thickness. Single tows can be treated (towpreg) or collimated groups of tows can form tapes. Tape and towpreg forms of the thermoplastic composite lend themselves to automated molding processes such as hot winding and automatic fiber placement. Sheets of the tape can be stacked in controlled orientations and pressed into useful laminates with the same press cycle as described above for glass prepregs.

EXAMPLE 4

SA 204 and three more latex types are applied to a 0/90 stitched glass fabric of 18 oz 0.61 kg/m$^2$) weight. The prepreg sheets are dried in an oven at 250–300° F. (121–149° C.) for 30 minutes. Eight sheets of each prepreg type are stacked and pressed to the press cycle as described in Example 1.

EXAMPLE 5

Although the prepregs of the invention will be assembled into preforms and pressed such faster than the competing epoxy systems, moldings with large compound curvatures may be slower to produce because each ply may need some preshaping before placing in the mold. This example eliminates the prepreg step and the forming of those prepregs. This makes the invention even more compatible with existing thermoset processes.

The shape of one side of the mold is approximately reproduced with a permeable material such as woven wire or perforated metal. The other side of the mold is also reproduced in woven wire or similar material that is reasonably rigid but will allow liquids to flow through. Layers of dry fabric (in the sizes and orientations required by the mechanical design) are then laid into the first shell of woven wire. The second shell of woven wire is then placed over the fabric layers such that the fabric layers are trapped between the woven wire layers and are formed to approximate the shape of the final molding. This preform of fabric layers is soaked and coated with a thermoplastic polymer latex. This preform is dried. The entrained polymer is fused if rough handling or prolonged storage is required. A preform is thus produced which is almost the final shape and can drop straight into the mold.

EXAMPLE 6

A stitched fabric with 18 oz/sq yard (0.61 kg/m 2) of continuous glass strands arranged with equal amounts in the 0° (warp), +45° and −45° directions is coated on a continuous basis. The fabric is dipped into an acrylic emulsion (Parachem 8444) with a solids content of 45% and a particle size of 200 nanometers. At a throughput of 55 yards/hour (0.14 m/s) the fabric picked up 38% solids by weight. At 110 yds/hour (0.28 m/s) the fabric picked up about 35% solids. The fabric was dried by passing through a 15 foot (4.5 m) oven at 350° F. (177° C.) and then a 10 foot (3 m) oven at 250° F. (121° C.). With this drying regime, a skin was formed on the outside of the prepreg by fusion of the acrylic while the bulk of the acrylic inside dried to a powder. This form allows maximum deformability of the prepreg while retaining polymer during handling. For maximum control of polymer weight all the polymer can be fused but then the prepreg becomes more difficult to handle.

EXAMPLE 7

The latex of Example 5 is applied to end-grain balsa and allowed to soak in. The acrylic coating is dried onto the balsa and then two prepressed plies of glass/acrylic are stacked each side of the balsa. A reduced pressure of 40 psi (276 kPa) and a temperature of 350° F. (177° C.) produces a sandwich panel and provides excellent peel properties.

Those skilled in the art will appreciate that all parameters listed herein are meant to be examples and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A method for forming a composite, comprising:

providing a strand comprising a plurality of fibers;

exposing the strand to an emulsion including polymer particles; and allowing the particles to form a coating around substantially each fiber.

2. The method of claim 1, wherein the polymer particles are prepared by emulsion polymerization.

3. The method of claim 1, wherein the polymer particles are prepared by grinding a solid polymer to a predetermined particle size.

4. The method of claim 1, wherein the emulsion including the polymer particles are prepared by precipitation of the particles from solution.

5. The method of claim 1, further comprising fusing the particles in the coating to form a polymer matrix around substantially each fiber.

6. The method of claim 5, wherein the polymer matrix is substantially free of voids.

7. The method of claim 5, wherein the fusing comprises applying an elevated temperature to the particles.

8. The method of claim 5, wherein the fusing occurs free of polymer flow.

9. The method of claim 7, wherein the elevated temperature is at least 125° C.

10. The method of claim 5, wherein the fusing comprises applying a pressure to the particles.

11. The method of claim 10, wherein the pressure is at least 345 kPa.

12. The method of claim 7, wherein the fusing further comprises applying a pressure.

13. The method of claim 1, wherein the particles have an average diameter of less than 0.25 times the fiber diameter.

14. The method of claim 1, wherein the particles have an average diameter of less than 5 $\mu$m.

15. The method of claim 1, wherein the polymer particles include an additive.

16. The method of claim 15, wherein the additive is selected from the group consisting of a dye, a flame retardant, a filler for the control of thermal expansion, a filler for the control of conductivity and a filler to lower cost.

17. The method of claim 15, wherein the additive is selected from the group consisting of a ceramic particle and a metallic particle.

18. The method of claim 17, further comprising burning off the polymer particles to form a composite selected from the group consisting of a ceramic composite and a metallic composite.

19. A method for forming a composite fabric, comprising:
providing a fabric comprising a plurality of strands, each strand having a plurality of fibers;
coating substantially each fiber of each strand with polymer particles; and
fusing the polymer particles to form a polymer matrix embedding substantially each fiber, the matrix being substantially free of voids.

20. The method of claim 19, further comprising positioning the strands in a predetermined orientation prior to coating.

21. The method of claim 19, wherein prior to coating, the plurality of strands are formed into a fabric by a process selected from the group consisting of weaving, braiding, needle-punching, knitting and stitching.

22. The method of claim 19, wherein the fusing comprises applying a pressure to the polymer particles.

23. The method of claim 22, wherein the fusing comprises applying an elevated temperature to the polymer particles.

24. The method of claim 19, wherein the fabric is provided in a continuous fashion.

25. The method of claim 24, wherein the providing step comprises:
providing a first roll for supplying a continuous first layer of strands, wherein each strand of the first layer is aligned along a first direction; and
providing at least a second roll of strands for supplying a continuous second layer of strands positionable adjacent the first layer to form a fabric, wherein each strand of the second layer is aligned along a second direction, which is different from the first direction.

26. The method of claim 25, further comprising a press to shape the fabric.

27. The method of claim 19, wherein an outer layer of the fabric is fused, the outer layer containing an inner core of the particles.

28. The method of claim 27, where in the fabric is a heavy weight fabric.

29. A method for forming a composite article, comprising:
providing an article having pores;
exposing the article to a polymer emulsion including polymer particles to allow the particles to impregnate the pores of the article and form a composite article which is substantially free of voids.

30. The method of claim 29, further comprising fusing the particles to form a polymer matrix in the pores of the article.

31. The method of claim 29, wherein the article is selected from the group consisting of a ceramic, wood and a foam.

32. The method of claim 1, further comprising drying the particles.

33. The method of claim 32, further comprising fusing the particles after the step of drying.

34. The method of claim 32, further comprising fusing the outside of the article to form a fused layer on the article.

35. The method of claim 10, wherein the pressure is between 207 to 276 kPa.

36. The method of claim 1 wherein the polymer particles are provided by a thermoplastic selected from the group consisting of polyolefins, polystyrene, polyamides, polyketones, polyimides, polypropylene oxide, acrylonitrile-butadiene-styrene, polyacetals, polyesters, polyphenoxies, polyacrylic esters, polyvinyl esters, polyvinyl halides, polysiloxanes, polyurethanes, polyethers, polysulfides, polycarbonates, polybutylenes, polyarylates and random copolymers, block copolymers, syndiotactic polymers, stereotactic polymers thereof and blends and alloys thereof.

* * * * *